United States Patent
Oh et al.

(10) Patent No.: US 9,106,166 B2
(45) Date of Patent: Aug. 11, 2015

(54) MOTOR DRIVING MODULE, OPERATING METHOD FOR THE SAME, AND BRUSHLESS DC MOTOR SYSTEM

(71) Applicant: Electronics and Telecommunications Research Institute, Daejeon (KR)

(72) Inventors: Jimin Oh, Daejeon (KR); Minki Kim, Daejeon (KR); Jung Hee Suk, Daejeon (KR); Yil Suk Yang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 13/959,647

(22) Filed: Aug. 5, 2013

(65) Prior Publication Data
US 2014/0159625 A1  Jun. 12, 2014

(30) Foreign Application Priority Data
Dec. 12, 2012 (KR) ............... 10-2012-0144132

(51) Int. Cl.
*H03K 5/00* (2006.01)
*H02P 6/14* (2006.01)
*H02P 6/16* (2006.01)

(52) U.S. Cl.
CPC ........ *H02P 6/142* (2013.01); *H02P 6/16* (2013.01); *H02P 6/14* (2013.01)

(58) Field of Classification Search
CPC ...................................... H02P 6/14; H02P 6/16
USPC ................ 318/400.13, 400.38, 400.39, 811
See application file for complete search history.

(56) References Cited

U.S. PATENT DOCUMENTS

| | | | |
|---|---|---|---|
| 6,713,981 B2* | 3/2004 | Nakajima | 318/491 |
| 7,274,161 B2* | 9/2007 | Mori et al. | 318/400.36 |
| 7,714,529 B2* | 5/2010 | Chen et al. | 318/712 |
| 7,777,436 B2* | 8/2010 | Brown et al. | 318/400.01 |
| 8,193,748 B2* | 6/2012 | Deller et al. | 318/400.04 |

FOREIGN PATENT DOCUMENTS

KR  10-1041101 B1  6/2011

OTHER PUBLICATIONS

Mark Brackley et al., "Analysis and Reduction of Acoustic Noise from a Brushless DC Drive", IEEE Transactions on Industry Applications, May/Jun. 2000, pp. 772-777, vol. 36, No. 3.
Nikolay Samoylenko et al., "Dynamic Performance of Brushless DC Motors With Unbalanced Hall Sensors", IEEE Transactions on Energy Conversion, Sep. 2008, pp. 752-763, vol. 23, No. 3.

* cited by examiner

*Primary Examiner* — Erick Glass
(74) *Attorney, Agent, or Firm* — Rabin & Berdo, P.C.

(57) ABSTRACT

The inventive concept provides a motor driving module, a operating method for the same, and a Brush less Direct Current (BLDC) motor system. The motor driving module is provided which comprises a motor driving unit configured to output a plurality of switching signals based on a plurality of position signals and a control signal; and a Pulse Width Modulation (PWM) inverter configured to output 3-phase voltages based on the plurality of switching signals outputted from the motor driving unit, wherein the motor driving unit comprises; a correction circuit configured to detect an error of the plurality of position signals to output a compensation signal based on the detecting result; and a control circuit configured to output the plurality of switching signals based on the compensation signal and the control signal, wherein the plurality of position signals indicate a position of a rotor in an external motor.

8 Claims, 7 Drawing Sheets

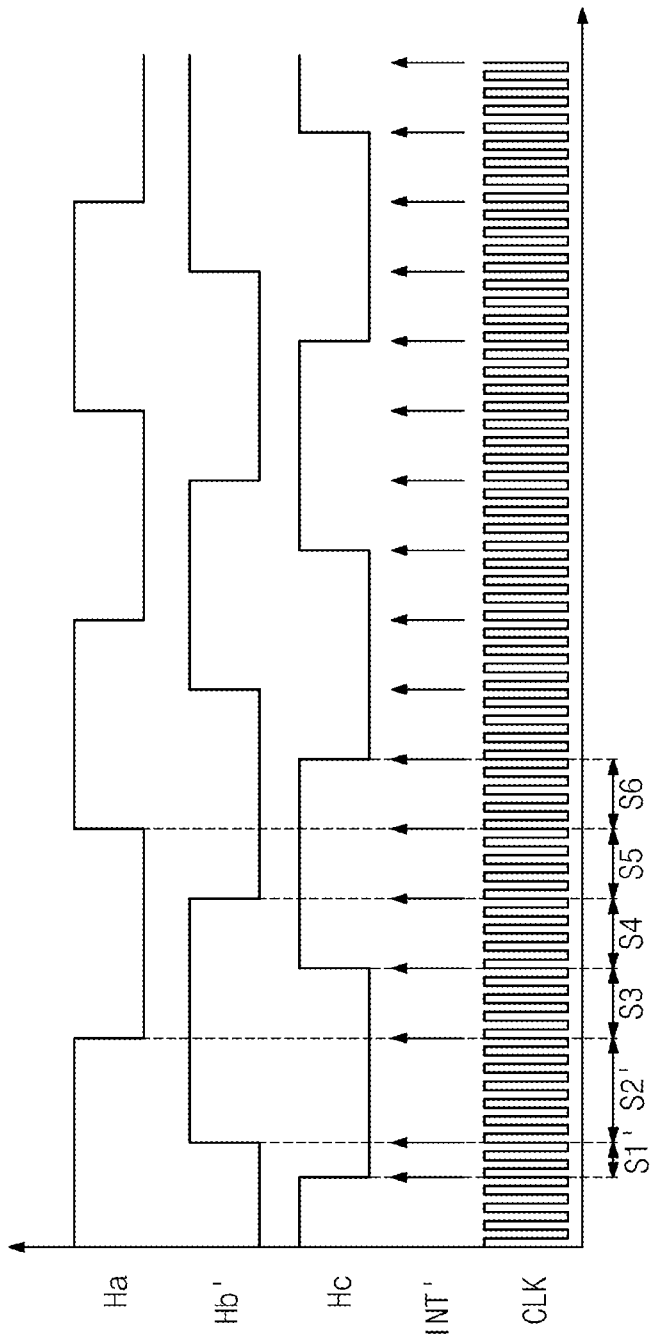

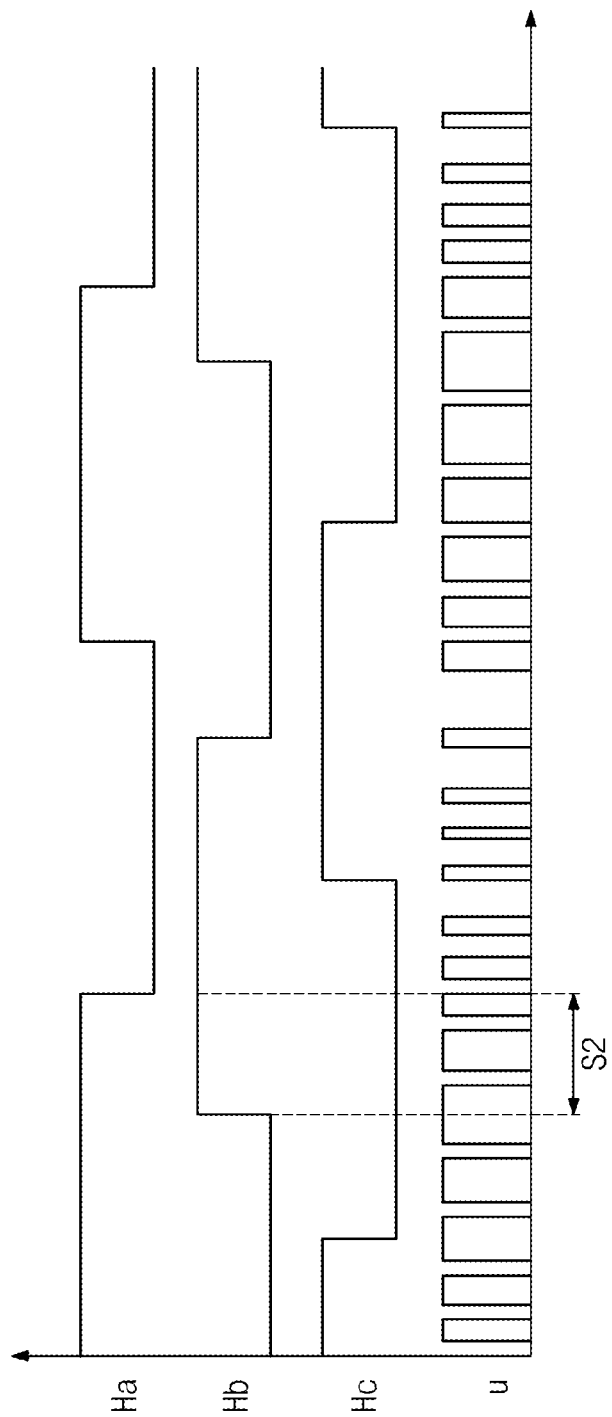

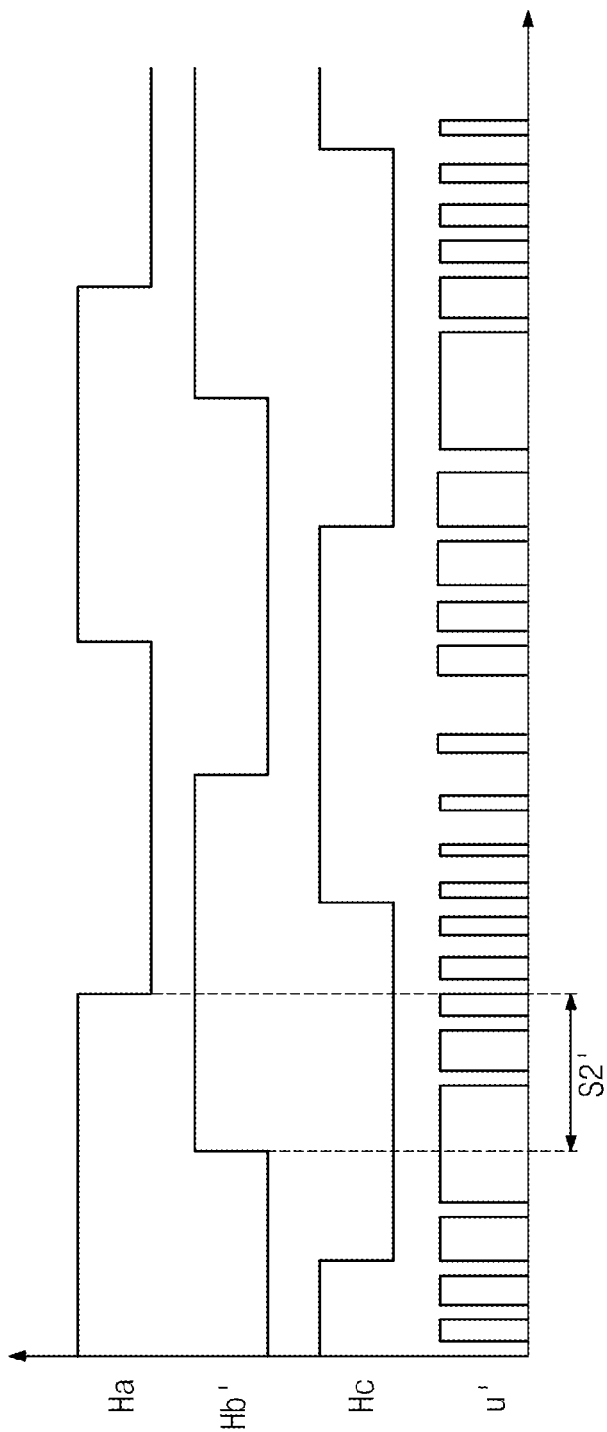

MOTOR DRIVING MODULE, OPERATING METHOD FOR THE SAME, AND BRUSHLESS DC MOTOR SYSTEM

CROSS-REFERENCE TO RELATED APPLICATIONS

This U.S. non-provisional patent application claims priority under 35 U.S.C. §119 of Korean Patent Application No. 10-2012-0144132, filed on Dec. 12, 2012, the entire contents of which are hereby incorporated by reference.

BACKGROUND OF THE INVENTION

The present invention disclosed herein relates to a motor, and more particularly, to a motor driving module and a Brush less Direct Current (BLDC) motor system including the same.

A motor is a device that converts electrical energy into mechanical energy by using the force of current in a magnetic field. The motor is classified into an AC motor and a DC motor according to a type of input power. The AC motor rotates a rotor by supplying current to the windings of a stator to change a magnetic field. The DC motor rotates a rotor by supplying a predetermined current to a rotor. At this point, the DC motor allows current to flow in a predetermined direction by using a brush regardless of the position of a rotor.

Recently, as power electronic control technology has been developed, a BLDC motor without a brush is developed through electronic switching technology. Since the BLDC motor does not use a brush, the heat generation and wear of a brush due to mechanical friction may be prevented. However, in order to control the BLDC motor, an additional device for detecting the position of a rotor is required.

SUMMARY OF THE INVENTION

The present invention provides a motor driving module for correcting an error of a position sensor in a BLDC motor system, a method of operating the same, and a BLDC motor system.

One aspect of embodiments of the inventive concept is directed to provide a motor driving module which comprise a motor driving unit configured to output a plurality of switching signals based on a plurality of position signals and a control signal; and a Pulse Width Modulation (PWM) inverter configured to output 3-phase voltages based on the plurality of switching signals outputted from the motor driving unit, wherein the motor driving unit comprises: a correction circuit configured to detect an error of the plurality of position signals to output a compensation signal based on the detecting result; and a control circuit configured to output the plurality of switching signals based on the compensation signal and the control signal, wherein the plurality of position signals indicate a position of a rotor in an external motor.

In example embodiments, the correction circuit may comprise a clock generator configured to generate a reference clock; an adder configured to generate an interrupt signal based on the plurality of position signals and to count a number of the reference clock during a plurality of steps; a register configured to store the number of the counted reference clock for a predetermined period; and an average configured to output the compensation signal based on the number of the reference clock stored in the register for the predetermined period.

In example embodiments, each of the plurality of steps is one period of the interrupt signal.

In example embodiments, the control circuit configured to control duty ratios of the plurality of switching signals based on the compensation signal.

In example embodiments, the control circuit configured to control the duty ratios of the plurality of switching signals for a time corresponding to a step having a different number of counting clock among the plurality of steps.

In example embodiments, the PWM inverter configured to control duty ratios of the 3-phase voltages based on the plurality of switching signals having the controlled the duty ratios.

Another aspect of embodiments of the inventive concept is directed provide a motor driving module Brush less Direct Current (BLDC) motor system which comprises a motor driving unit configured to output a plurality of switching signals based on a plurality of position signals and a control signal; a PWM inverter configured to output 3-phase voltages based on the plurality of switching signals outputted from the motor driving unit; and a BLDC motor configured to operate based on the 3-phase voltages, wherein the BLDC motor comprises: a plurality of position sensors configured to output the plurality of position signals, wherein the motor driving unit comprises: a correction circuit configured to detect a placement error of the plurality of position signals and to output a compensation signal based on the result of detection; and a control circuit configured to output the plurality of switching signals based on the compensation signal and the control signal.

In example embodiments, the plurality of position sensors configured to output the plurality of position signals based on a position of a rotor in the BLDC motor.

In example embodiments, the plurality of position sensors are Hall elements.

Still another aspect of embodiments of the inventive concept is directed to provide a operating method for a motor driving module controlling an operation of a BLDC motor. The operating method comprises generating a reference clock; receiving first to third position signals; generating an interrupt signal based on the received first to third position signals; counting numbers of clock corresponding to a plurality of steps of the generated interrupt signal; generating a compensation signal based on the counting result; and outputting 3-phase voltages based on the compensation signal, wherein the numbers of clock is the number of logic highs of the reference clock for a time of each of the plurality of steps of the generated interrupt signal.

In example embodiments, the interrupt signal is an impulse signal generated at rising edges and falling edges of the first to third position signals.

In example embodiments, the outputting of the 3-phase voltages based on the compensation signal comprises adjusting a duty ratio of the 3-phase voltages based on the compensation signal.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIGS. 5A and 5B are graphs illustrating operations of the control circuit of FIG. 2.

DETAILED DESCRIPTION OF PREFERRED EMBODIMENTS

Embodiments of the present invention will be described in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Figure 1:
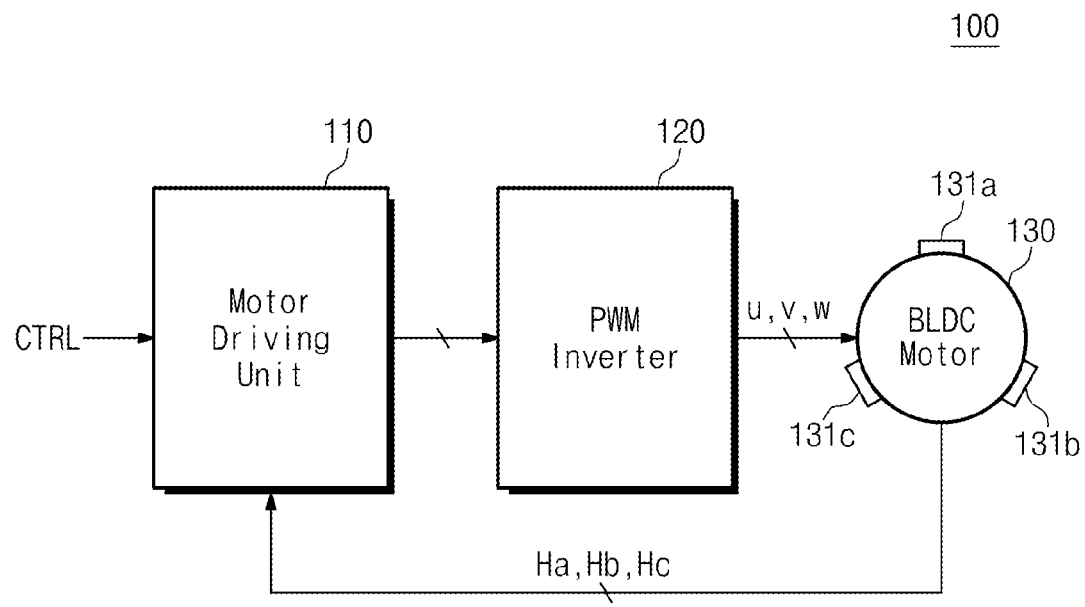
FIG. 1 is a block diagram of a Brush less Direct Current (BLDC) motor system according to an embodiment of the present invention.

FIG. 1 is a block diagram of a Brush less Direct Current (BLDC) motor system according to an embodiment of the present invention. For example, the BLDC motor system 100 operates based on a 3-phase power generated by a Pulse Width Modulation (PWM) modulation scheme.

Referring to FIG. 1, the BLDC motor system 100 includes a motor driving unit 110, a PWM inverter 120, and a BLDC motor 130.

The motor driving unit 110 controls the PWM inverter 120 in response to first to third position signals Ha, Hb, and Hc and a control signal CTRL. For example, the motor driving unit 110 may receive the first to third position signals Ha, Hb, and Hc from first to third position sensors 131a, 131b, and 131c in the BLDC motor 130. The motor driving unit 110 may detect the position of a rotor in the BLDC motor 130 on the basis of the received first to third position signals Ha, Hb, and Hc. The motor driving unit 110 outputs a plurality of switching signals for controlling the PWM inverter 120 on the basis of the detected positions.

In example embodiments, the motor driving unit 110 may compensate for a placement error of the first to third position sensors 131a, 131b, and 131c. The placement error refers to an error of a mechanical angle difference between the first to third position sensors 131a, 131b, and 131c due to the design, or production, or external shocks. For example, in the ideal case, the first to third position sensors 131a, 131b, and 131c are arranged at an interval of a 120° mechanical angle. However, due to design, production, or external shock, an interval between the first to third position sensors 131a, 131b, and 131c may vary. The above-mentioned configuration and operations of the motor driving unit 110 will be described in more detail with reference to FIG. 3.

The PWM inverter 120 outputs 3-phase voltages u, v, and w according to a control of the motor driving unit 110. For example, the PWM inverter 120 may include six switching devices. The PWM inverter 120 may output 3-phase voltages u, v, and w by controlling the six switching devices on the basis of a plurality of switching signals outputted from the motor driving unit 110. For example, the plurality of switching devices in the PWM inverter 120 may be provided based on a power semiconductor device such as an insulated gate bipolar mode transistor (IGBT), a gate turn-off thyristor (GTO), a power diode, and so on. For example, the 3-phase voltages u, v, and w may have a square wave form including harmonic wave.

In example embodiments, the motor driving unit 110 and the PWM inverter 120 may be provided as one motor driving module.

The BLDC motor 130 may operate based on the 3-phase voltages u, v, and w outputted from the PWM inverter 120. For example, the BLDC motor 130 includes a rotor and a stator. The rotor may include a permanent magnet. The stator receives the 3-phase voltages u, v, and w. Since the fundamental waves of the 3-phase voltages u, v, and w are sine waves having a specific frequency, a magnetic field occurring from the stator changes according to the 3-phase voltages u, v, and w. Electromagnetic force occurs according to an electromagnetic induction phenomenon on the basis of the direction of the changing electromagnetic field. The rotor rotates by the generated electromagnetic force.

The BLDC motor 130 includes the first to third position sensors 131a, 131b, and 131c for detecting the position of the rotor. For example, the first to third position sensors 131a, 131b, and 131c may be provided based on a hall element. The hall element is an element for measuring a strength of magnetic field. That is, the first to third position sensors 131a, 131b, and 131c measure strengths of magnetic fields changed according to the rotation of the rotor, and then, outputs the measured strengths of magnetic fields. In example embodiments, the BLDC motor 130 of FIG. 1 includes the first to third position sensors 131a, 131b, and 131c. However, the present invention is not limited thereto, and thus, the BLDC motor 130 may further include a plurality of position sensors.

Figure 2:
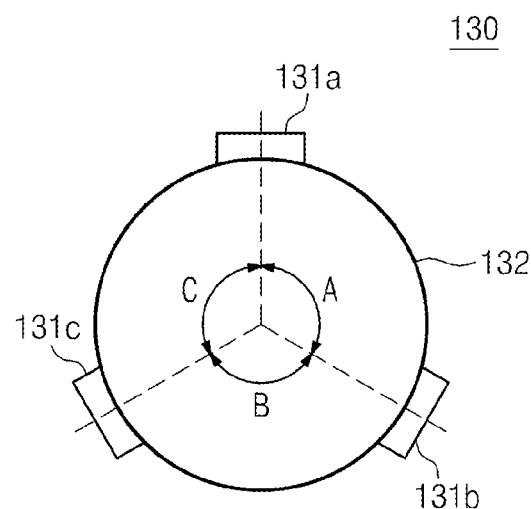
FIG. 2 is a view illustrating the BLDC motor of FIG. 1.

FIG. 2 is a drawing illustrating the BLDC motor 130 of FIG. 1. Referring to FIG. 2, the first to third position sensors 131a, 131b, and 131c may be disposed at the fixed positions to detect the position of a rotor 132. For example, the first to third position sensors 131a, 131b, and 131c may be positioned at the surface of the rotor 132. The first to third position sensors 131a, 131b, and 131c may be spaced apart from each other at the intervals A, B, and C, respectively. The first interval A refers to a mechanical angle between the first and second position sensors 131a and 131b. The second interval B refers to a mechanical angle between the second and third position sensors 131b and 131c. The third interval C refers to a mechanical angle between the third and first position sensors 131c and 131a.

In the ideal case, the first to third intervals A, B, and C may have a 120° mechanical angle. However, due to design, production, or external shock, the positions of the first to third position sensors 131a, 131b, and 131c may vary. In this case, the first to third intervals A, B, and C may not be a 120° mechanical angle. Hereinafter, when the first to third intervals A, B, and C are not be a 120° mechanical angle, this will be referred to as a placement error of position sensors.

Figure 3:
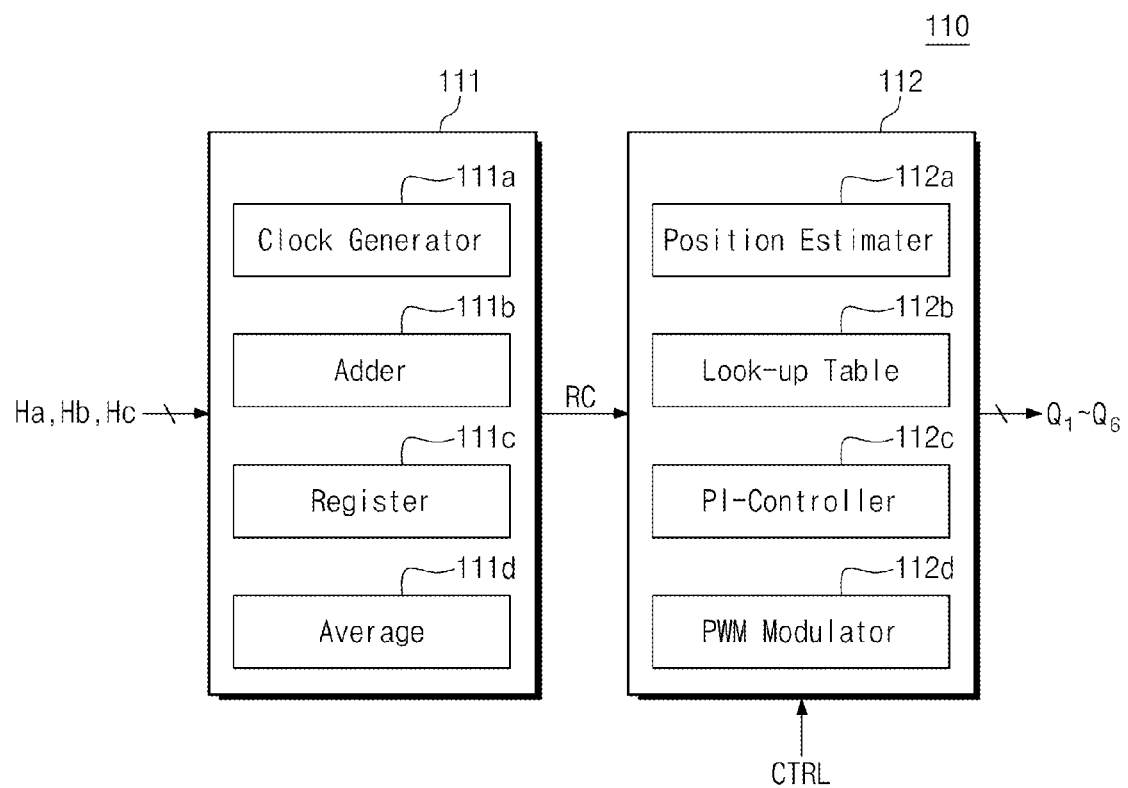
FIG. 3 is a block diagram illustrating the motor driving unit of FIG. 1.

FIG. 3 is a block diagram illustrating the motor driving unit 110 of FIG. 1. Referring to FIG. 3, the motor driving unit 110 includes a correction circuit 111 and a control circuit 112. The correction circuit 111 receives the position signals Ha, Hb, and Hc from the first to third position sensors 131a, 131b, and 131c, and then, determines there is a placement error of the first to third position sensors 131a, 131b, and 131c. The correction circuit 111 outputs a compensation signal RC on the basis of a determination result.

The correction circuit 111 includes a clock generator 111a, an adder 111b, a register 111c, and an average 111d. The clock generator 111a generates a reference clock CLK having a specific frequency. The specific frequency may be determined based on the speed of the BLDC motor 130 and the frequency of PWM carrier wave. In example embodiments, the clock generator 111a may output a reference clock CLK having a frequency of about 10 MHz.

The adder 111b calculates a difference between interrupt signals INT of the first to third position signals Ha, Hb, and Hc. For example, the adder 111b may generate the interrupt signals INT at the rising edges and falling edges of the first to third position signals Ha, Hb, and Hc. The interrupt signals INT refer to impulse signals occurring at the rising edges and falling edges of the first to third position signals Ha, Hb, and Hc. The adder 111b compares the reference clock CLK with the interrupt signal INT to count the clocks of the interrupt signal INT, and then outputs the clock count.

The register 111c stores the clock count of the interrupt signals INT outputted from the adder 111b. In example embodiments, the register 111c may store a clock count for a predetermined period.

The average 111d may output a compensation signal RC on the basis of the counting clock stored in the register 111c. For example, the average 111d may average the counting clock for a predetermined period. The average 111d may output the averaged value. Operations of the correction circuit 111 will be described in more with reference to FIGS. 4A and 4B.

The control circuit 112 may receive the control signal CTRL and the compensation signal RC from the correction circuit 111, and then, may generate a plurality of switching signals Q1 to Q6 for controlling a plurality of switching devices in the PWM inverter 120. The control circuit 112 includes a Position Estimater 112a, a Look-up Table 112b, a PI-Controller 112c, and a PWM modulator 112d.

The position estimater 112a may estimate the position of a rotor in the BLDC motor 130 on the basis of the received compensation signal RC.

The look-up table 112b includes information on the corrected 3-phase voltages u', v', and w' corresponding to the correct signal RC.

The PI-controller 112c may control the PWM modulator 112c on the bases of the received compensation signal RC and control signal CTRL. For example, the PI-controller 112c may search for information on the corrected 3-phase voltages u', v', and w' corresponding to the compensation signal RC on the basis of the look-up table 112b. The PI-controller 112c may control the PWM modulator 112d so that the PWM inverter 120 outputs the searched 3-phase voltages u', v', and w'. In example embodiments, the PI-controller 112c may operate based on a proportional action and an integral action.

The PWM modulator 112d outputs a plurality of switching signals according to a control of the PI-controller 112c. For example, the PWM modulator 112d outputs a plurality of switching signals for controlling a plurality of switch devices in the PWM inverter 120, according to a control of the PI-controller 112c.

Figure 4A:
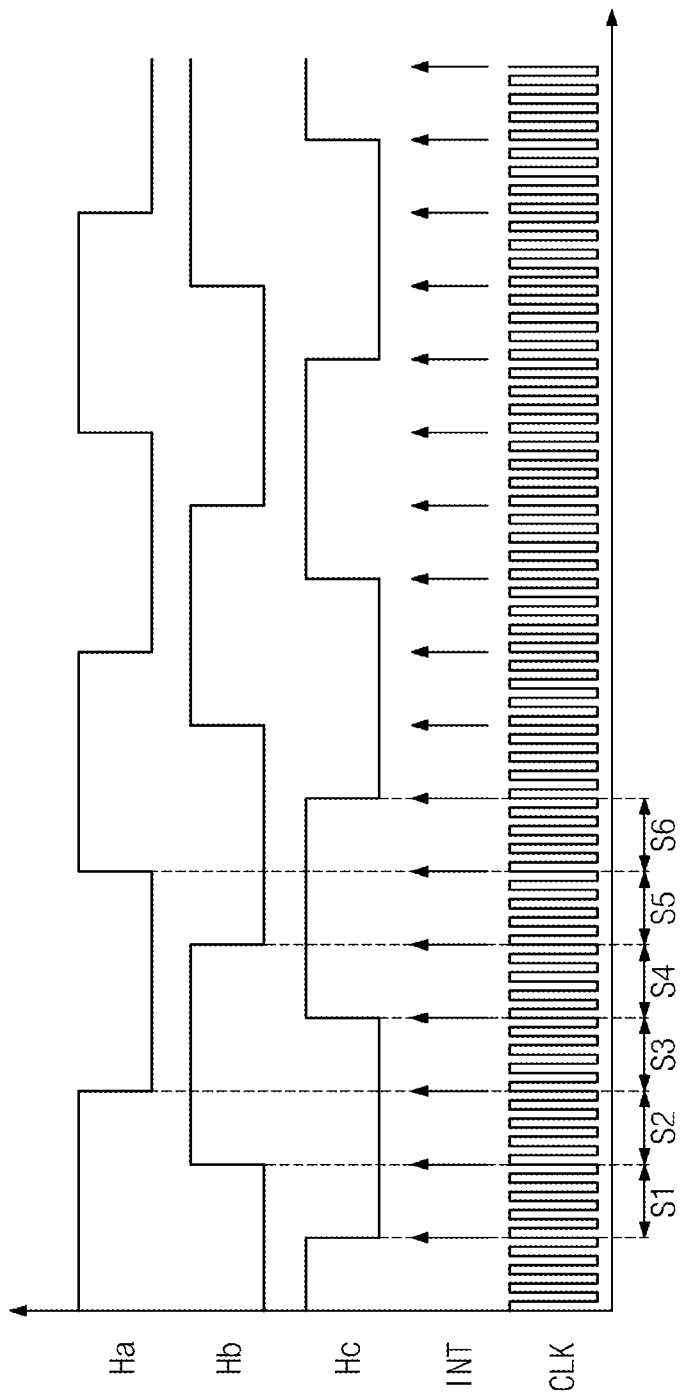
FIGS. 4B and 4B are graphs illustrating operations of the correction circuit of FIG. 3.

FIGS. 4A and 4B are graphs illustrating operations of the correction circuit 111 of FIG. 3. For example, the graph of FIG. 4A shows that there is no placement error of the first to third position sensors 131a, 131b, and 131c, and the graph of FIG. 4B shows that there is an placement error of the first to third position sensors 131a, 131b, and 131c. In example embodiments, X-axes of the graphs of FIGS. 4A and 4B represent time and Y-axes represent a signal level.

Referring to FIG. 4A, the first to third position sensors 131a, 131b, and 131c may output the first to third position signals Ha, Hb, and Hc, respectively. For example, the first position sensor 131a outputs a logic high when a strength of a magnetic field generated by a rotor is greater than a predetermined level in a direction where the first position sensor 131a is located. On the contrary, the first position sensor 131a outputs a logic low when the strength of a magnetic field generated by a rotor is less than a predetermined level in a direction where the first position sensor 131a is located.

Based on the above method, the second and third position sensors 131b and 131c may output the second and third position signals Hb and Hc, respectively. In example embodiments, the first to third position sensors 131a, 131b, and 131c may have a difference of a 120° mechanical angle. Accordingly, the first to third position signals Ha, Hb, and Hc may have a 120° phase difference.

As shown in FIG. 4A, the correction circuit 111 generates the interrupt signals INT at the rising edges and falling edges of the first to third position signals Ha, Hb, and Hc. The correction circuit 111 may detect a time difference between the plurality of the generated interrupt signals INT. For example, the correction circuit 111 may generate a reference clock CLK having a specific frequency.

The correction circuit 111 may count the clocks during each of first to sixth steps S1 to S6. The clock count refers to the number of the logic highs of the reference clock CLK during each of the first to sixth steps S1 to S6. For example, as the rotor of the BLDC motor 130 rotates once, the interrupt signal is generated six times. That is the one period operation of the BLDC motor 130 is divided into the first to sixth steps S1 to S6. At this point, the correction circuit 111 may count the clocks during each of the first to sixth operations S1 to S6. In the ideal case that there is no placement error of the first to third position sensors 131a, 131b, and 131c, as shown in FIG. 4A, the number of clocks occurring each of the first to sixth steps S1 to S6 may be the same.

Then, referring to FIG. 4B, due to a placement error, the second position signal Hb' lags behind the second position signal Hb of FIG. 4A by a some phase. The first and second steps S1' and S2' of when a placement error occurs are different from the first and second steps S1 and S2 of FIG. 4A. In example embodiments, it is assumed in the graph of FIG. 4B that a placement error of the second position sensor 131b occurs. However, the present invention is not limited thereto. Thus, if there is a placement error of another position sensor, the clock count may be changed in steps other than the steps of FIG. 4B.

The correction circuit 111 determines that the clock count during the first and second steps S1 and S2 is different from that during the third to sixth steps S3 to S6. Accordingly, the correction circuit 111 may output a compensation signal RC for compensating for a placement error of one of the first to third position sensors 131a, 131b, and 131c. In example embodiments, the control circuit 112 may control the phase, frequency, and size of the 3-phase voltages u, v, and w on the basis of the compensation signal RC.

FIGS. 5A and 5B are graphs illustrating operations of the control circuit 112 of FIG. 2. In example embodiments, the graph of FIG. 5A shows that the first to third position sensors 131a, 131b, and 131c are disposed at normal positions and operate ideally, and the graph of FIG. 5B shows that there is an placement error of the second position sensor 131b. In example embodiments, X-axes of the graphs of FIGS. 5A and 5B represent time and Y-axes represent a signal level.

Referring to FIG. 5A, the first to third position signals Ha, Hb, and Hc may have a 120° phase difference. That is, the first to third position sensors 131a to 131c are positioned at normal positions. In this case, the control circuit 112 may control the PWM inverter 120 to output a u-phase voltage u on the basis of the position of a rotor detected by the estimater 112a and the control signal CTRL. In example embodiments, the u-phase voltage u may be a square wave form including harmonic wave as shown in FIG. 5A. The fundamental wave component of the u-phase voltage u may be a sine wave.

Then, referring to FIG. 5B, the second position signal Hb' lags behind the second position signal Hb of FIG. 5A by a predetermined phase. That is, the second position sensor 131b has a placement error. In this case, the correction circuit 111 outputs a compensation signal RC through the method described with reference to FIGS. 4A and 4B. The control circuit 112 may output a u-phase correction voltage u' on the basis of the compensation signal RC and the control signal CTRL. For example, the clock count of the second step S2', when there is a placement error, may be less than that of the second step S2 in the ideal case. In this case, the control circuit 112 increases the duty ratio of the u-phase correct voltage u' for a predetermined time corresponding to the second step S2. In example embodiments, the control circuit 112 may control the duty ratios of the 3-phase voltages u, v, and w by adjusting the duty ratios of a plurality of switching signals.

Unlike the u-phase voltage u of FIG. 5A, the u-phase correct voltage u' of FIG. 5B is a high level voltage in the second step S2'. That is, the control unit 112 outputs the u-phase correct voltage u' as shown in FIG. 5B in order to compensate for the placement error of the second position sensor 131b. In example embodiments, although the u-phase correct voltage u' is described with reference to FIGS. 5A and 5B, the present invention is not limited thereto, and v-phase and w-phase voltages v and w may be compensated on the basis of the above methods.

Figure 6:
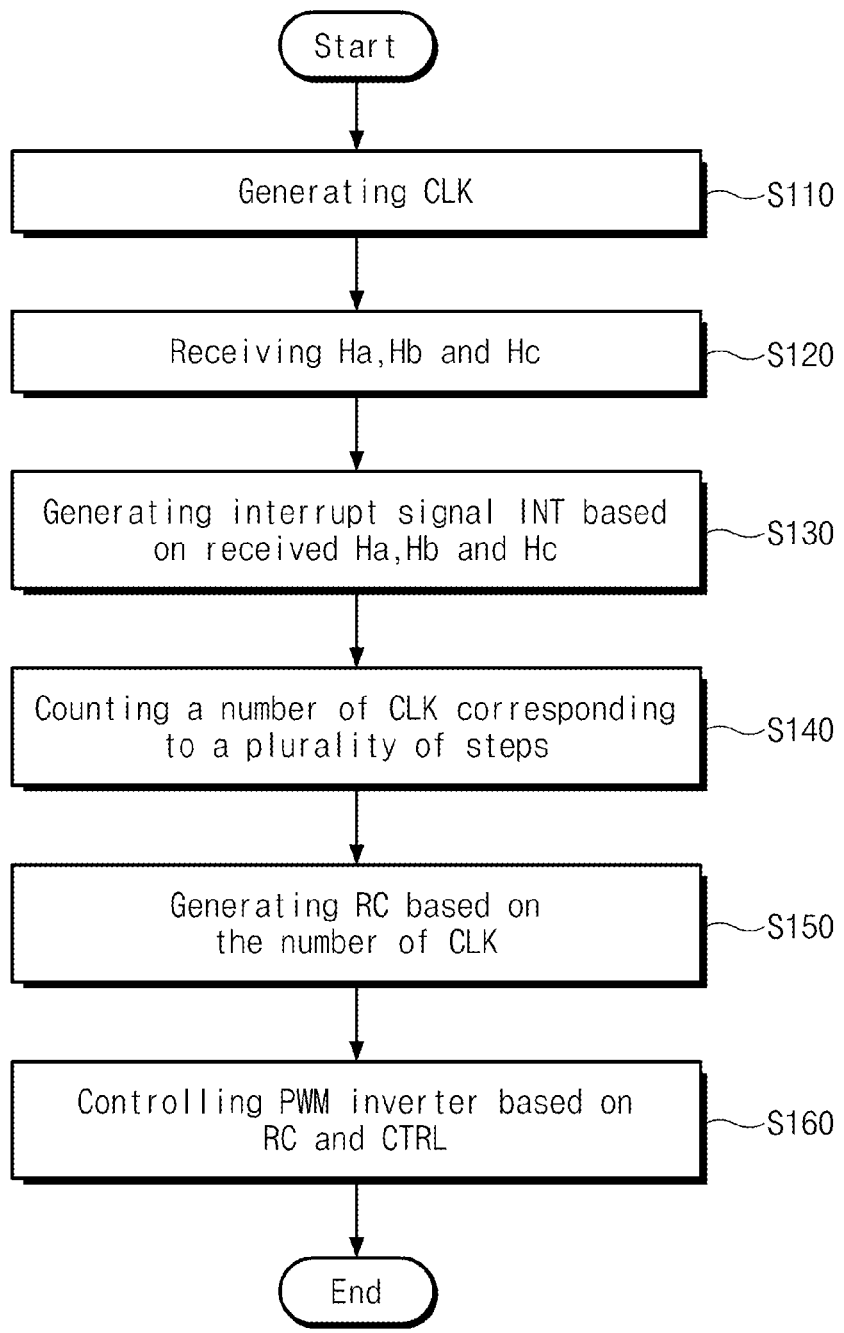
FIG. 6 is a flowchart illustrating operations of the motor driving unit of FIG. 1.

FIG. 6 is a flowchart illustrating operations of the motor driving unit 110 of FIG. 1. In example embodiments, it is assumed that the motor driving unit 110 receives the first to third position signals Ha, Hb, and Hc from the first to third position sensors 131a, 131b, and 131c. However, the present invention is not limited thereto, and thus, the motor driving unit 110 may receive a plurality of position signals.

Referring to FIG. 6, in operation S110, the motor driving unit 110 generates a reference clock CLK. For example, the motor driving unit 110 generates a reference clock CLK having a predetermined frequency. The predetermined frequency may be determined on the basis of the BLDC motor 130.

In operation S120, the motor driving unit 110 receives the first to third position signals Ha, Hb, and Hc from the first to third position sensors 131a, 131b, and 131c.

In operation S130, the motor driving unit 110 generates an interrupt signal INT on the basis of the received first to third position signals Ha, Hb, and Hc. For example, the motor driving unit 110 generates interrupt signals INT at the rising edges and falling edges of the first to third position signals Ha, Hb, and Hc.

In operation S140, the motor driving unit 110 may count the clocks corresponding to the steps S1 to S6 of the interrupt signal INT. For example, when the BLDC motor 130 includes the first to third position sensors 131a, 131b, and 131c, one period of an operation of the BLDC motor 130 may be divided into the first to sixth steps S1 to S6. At this point, the motor driving unit 110 may count the clocks during each of the first to sixth steps S1 to S6 on the basis of a reference clock CLK.

In operation S150, the motor driving unit 110 generates a compensation signal RC on the basis of a counting result. For example, when there is no placement error of the first to third position sensors 131a, 131b, and 131c, the number of clocks corresponding to each of the first to sixth steps S1 to S6 is the same. However, when there is a placement error of one of the first to third position sensors 131a, 131b, and 131c, the number of clocks corresponding to each of the first to sixth steps S1 to S6 may be different from each other. In this case, the motor driving unit 110 determines that a placement error of a position sensor occurs, and then, outputs a compensation signal RC on the basis of the number of clocks corresponding to each of the first to sixth steps S1 to S6.

In operation S160, the motor driving unit 110 controls the PWM inverter 120 on the bases of the compensation signal RC and control signal CTRL. For example, the control signal CTRL may be a signal generated based on information such as the speed and operation mode of the BLDC motor 130. The motor driving unit 110 may include information on 3-phase correct voltages u', v', and w' corresponding to the compensation signal RC. The motor driving unit 110 controls the PWM inverter 120 on the basis of the information on 3-phase correct voltages u', v', and w' corresponding to the compensation signal RC and the control signal CTRL. In example embodiments, the motor driving unit 110 may control the PWM inverter 120 to adjust the duty ratios of the 3-phase voltages u', v', and w'. For example, when the BLDC motor 130 operates on the basis of the 3-phase voltages u', v', and w', the placement errors of a plurality of position sensors may be corrected.

According to an embodiment of the present invention, a motor driving unit receives a plurality of position signals from a plurality of position sensors in a BLDC motor. The motor driving unit may detect the placement errors of a plurality of position sensors on the basis of the plurality of the received position signals and then may compensate the detected placement errors. Accordingly, a motor driving unit and BLDC motor system having improved reliability and performance are provided.

According to an embodiment of the present invention, a BLDC motor system may compensate errors of a plurality of position sensors. Therefore, provided are a motor driving module having improved performance and reliability, a method of operating the same, and a BLDC motor system.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A motor driving module comprising:
a motor driving unit configured to output a plurality of switching signals based on a plurality of position signals and a control signal; and
a Pulse Width Modulation (PWM) inverter configured to output 3-phase voltages based on the plurality of switching signals outputted from the motor driving unit,
wherein the motor driving unit comprises:
a correction circuit configured to detect an error of the plurality of position signals to output a compensation signal based on the detecting result; and
a control circuit configured to output the plurality of switching signals based on the compensation signal and the control signal,
wherein the plurality of position signals indicate a position of a rotor in an external motor, and
wherein the compensation signal corresponds to a clock count taken during output of the plurality of position signals,
wherein the correction circuit comprises:
a clock generator configured to generate a reference clock;
an adder configured to generate an interrupt signal based on the plurality of position signals and to count a number of the reference clock during a plurality of steps;

a register configured to store the number of the counted reference clock for a predetermined period; and an average configured to output the compensation signal based on the number of the reference clock stored in the register for the predetermined period.

2. The motor driving module of claim 1, wherein each of the plurality of steps is one period of the interrupt signal.

3. The motor driving module of claim 2, wherein the control circuit configured to control duty ratios of the plurality of switching signals based on the compensation signal.

4. The motor driving module of claim 3, wherein the control circuit configured to control the duty ratios of the plurality of switching signals for a time corresponding to a step having a different number of counting clock among the plurality of steps.

5. The motor driving module of claim 4, wherein the PWM inverter configured to control duty ratios of the 3-phase voltages based on the plurality of switching signals having the controlled the duty ratios.

6. A operating method for a motor driving module controlling an operation of a BLDC motor, the operating method comprising:

generating a reference clock;
receiving first to third position signals;
generating an interrupt signal based on the received first to third position signals;
counting numbers of clock corresponding to a plurality of steps of the generated interrupt signal;
generating a compensation signal based on the counting result; and
outputting 3-phase voltages based on the compensation signal,
wherein the numbers of clock is the number of logic highs of the reference clock for a time of each of the plurality of steps of the generated interrupt signal.

7. The operating method of claim 6, wherein the interrupt signal is an impulse signal generated at rising edges and falling edges of the first to third position signals.

8. The operating method of claim 6, wherein the outputting of the 3-phase voltages based on the compensation signal comprises adjusting a duty ratio of the 3-phase voltages based on the compensation signal.

* * * * *